(12) United States Patent
Lee

(10) Patent No.: US 7,213,935 B2
(45) Date of Patent: *May 8, 2007

(54) STRUCTURE OF A SHINING PERSONAL ADORNMENT

(76) Inventor: Ching-Hui Lee, No. 13, Kangtzuwei, Madou Township, Tainan County (TW)

(*) Notice: Subject to any disclaimer, the term of this patent is extended or adjusted under 35 U.S.C. 154(b) by 63 days.

This patent is subject to a terminal disclaimer.

(21) Appl. No.: 11/159,247

(22) Filed: Jun. 23, 2005

(65) Prior Publication Data

US 2006/0291210 A1    Dec. 28, 2006

(51) Int. Cl.
*F21V 33/00* (2006.01)
*F21V 21/08* (2006.01)

(52) U.S. Cl. .............. 362/104; 362/103; 362/570; 362/806; 362/249

(58) Field of Classification Search .......... 362/84, 362/103, 104, 570, 219, 235, 249, 806, 551; 63/3, 31
See application file for complete search history.

(56) References Cited

U.S. PATENT DOCUMENTS

| 2,405,384 | A  | * | 8/1946 | White ................ 362/104 |
| 4,262,324 | A  | * | 4/1981 | Murphy ............... 362/104 |
| 6,626,009 | B1 | * | 9/2003 | Ohlund ............... 63/3.1  |
| 7,001,056 | B2 | * | 2/2006 | Clegg ................ 362/571 |
| 7,104,668 | B1 | * | 9/2006 | Lee .................. 362/104 |

* cited by examiner

*Primary Examiner*—Thomas M. Sember
(74) *Attorney, Agent, or Firm*—Rosenberg, Klein & Lee

(57) ABSTRACT

A shining personal adornment includes a hollow body pervious to light, a glowing unit, a power supplying unit and two connecting members. The shining unit is held in the hollow body, and it includes a control element and several light emitting elements electrically connected to the control circuit element. The power supplying unit has a switch for controlling the flow of electricity therefrom. The connecting members are joined to respective ones of two ends of the hollow main body. Further, the connecting members are joined to respective ones of the two ends of the power supplying unit such that the glowing unit is electrically connected to the power supplying unit, wherein the whole shining personal adornment has a substantially circular shape.

20 Claims, 8 Drawing Sheets

STRUCTURE OF A SHINING PERSONAL ADORNMENT

BACKGROUND OF THE INVENTION

1. Field of the Invention

The present invention relates to a shining personal adornment, more particularly one, which includes a tubular main body, a shining unit held in the tubular main body, and a power supplying unit for providing electric power to the shining unit; the power supplying unit being joined to two ends of the tubular main body such that the whole shining personal adornment is in a substantially shape.

2. Brief Description of the Prior Art

Referring to FIG. 1, glowing sticks and electronic lighting tubes are often seen in concerts, parties, festivals etc, which are held in hands, and waved for helping create atmosphere in the scenes. However, the conventional glowing sticks and electronic lighting tubes can only be held in hands while the users are dancing or posture.

Furthermore, most of the conventional glowing sticks contain catalytic agent, and a kind of luminous chemical therein such that glow will be produced when the luminous chemical is mixed with the catalytic agent. Because the above-mentioned glowing sticks can only be used once, the chemical therein will cause pollution to the environment when discarded after use.

SUMMARY OF THE INVENTION

It is a main object of the present invention to provide an improvement on a shining personal adornment to overcome the above-mentioned problems. The shining adornment of the invention includes a hollow body, a shining unit, a power supplying unit, and two connecting members. The hollow body is pervious to light. The shining unit is held in the hollow body. The power supplying unit has a switch for controlling flow of electricity from it. The connecting members are joined to respective ones of two ends of the hollow main body, and they are joined to respective ones of two ends of the power supplying unit such that the shining unit is electrically connected to the power supplying unit, and such that the whole shining adornment is in a substantially circular shape.

BRIEF DESCRIPTION OF THE DRAWINGS

The present invention will be better understood by referring to the accompanying drawings, wherein.

DETAILED DESCRIPTION OF THE PREFERRED EMBODIMENTS

Referring to FIGS. 2 to 6, a first preferred embodiment of a shining personal adornment includes a hollow main body 1, a shining unit 2, a power supplying unit 3, and two connecting members 4.

The hollow main body 1 is tubular, soft and pervious to light, and it can be made of plastic or cloth.

Figure 1:
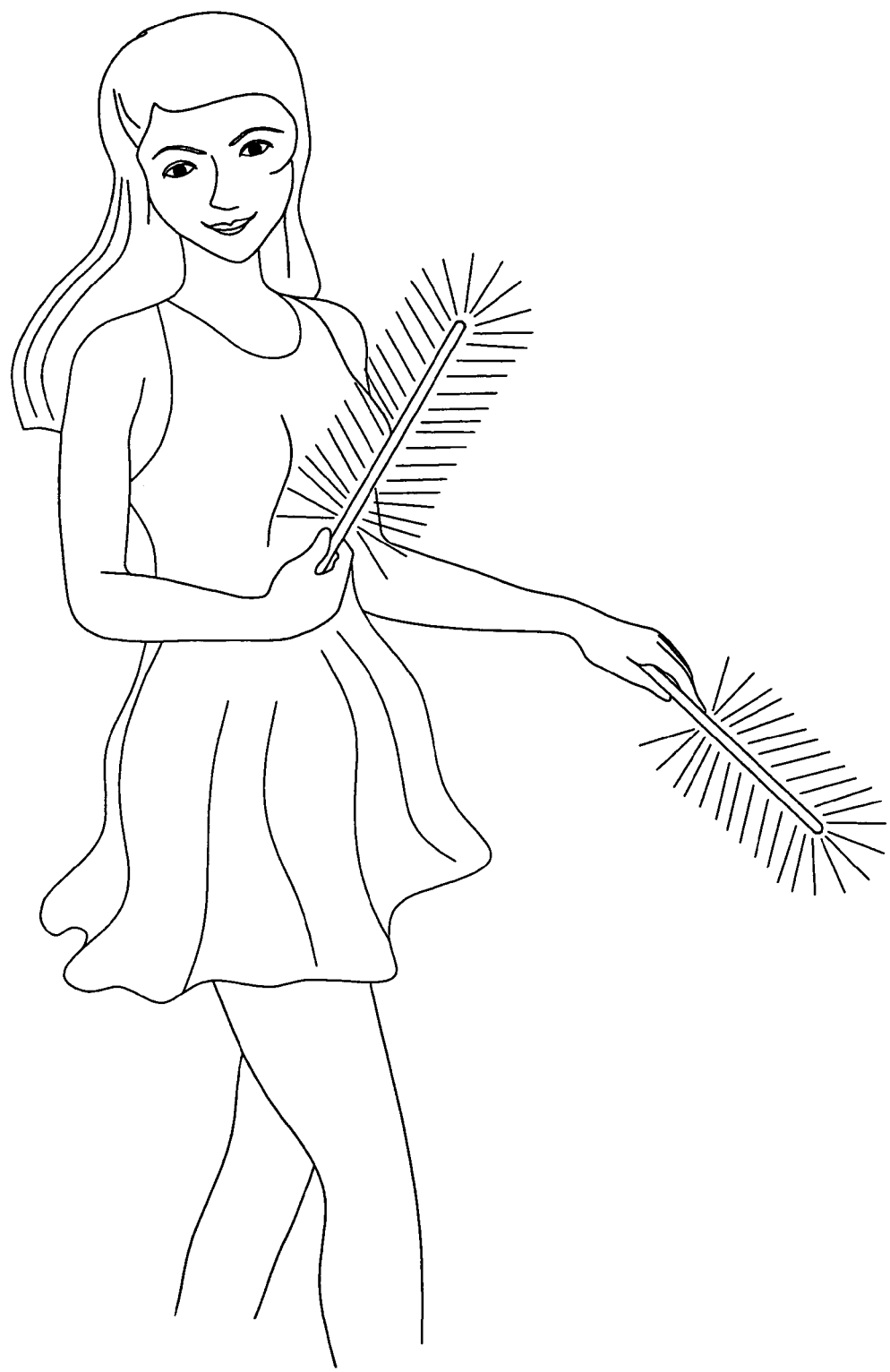
FIG. 1 is a view showing a way to use conventional glowing sticks.
Figure 2:
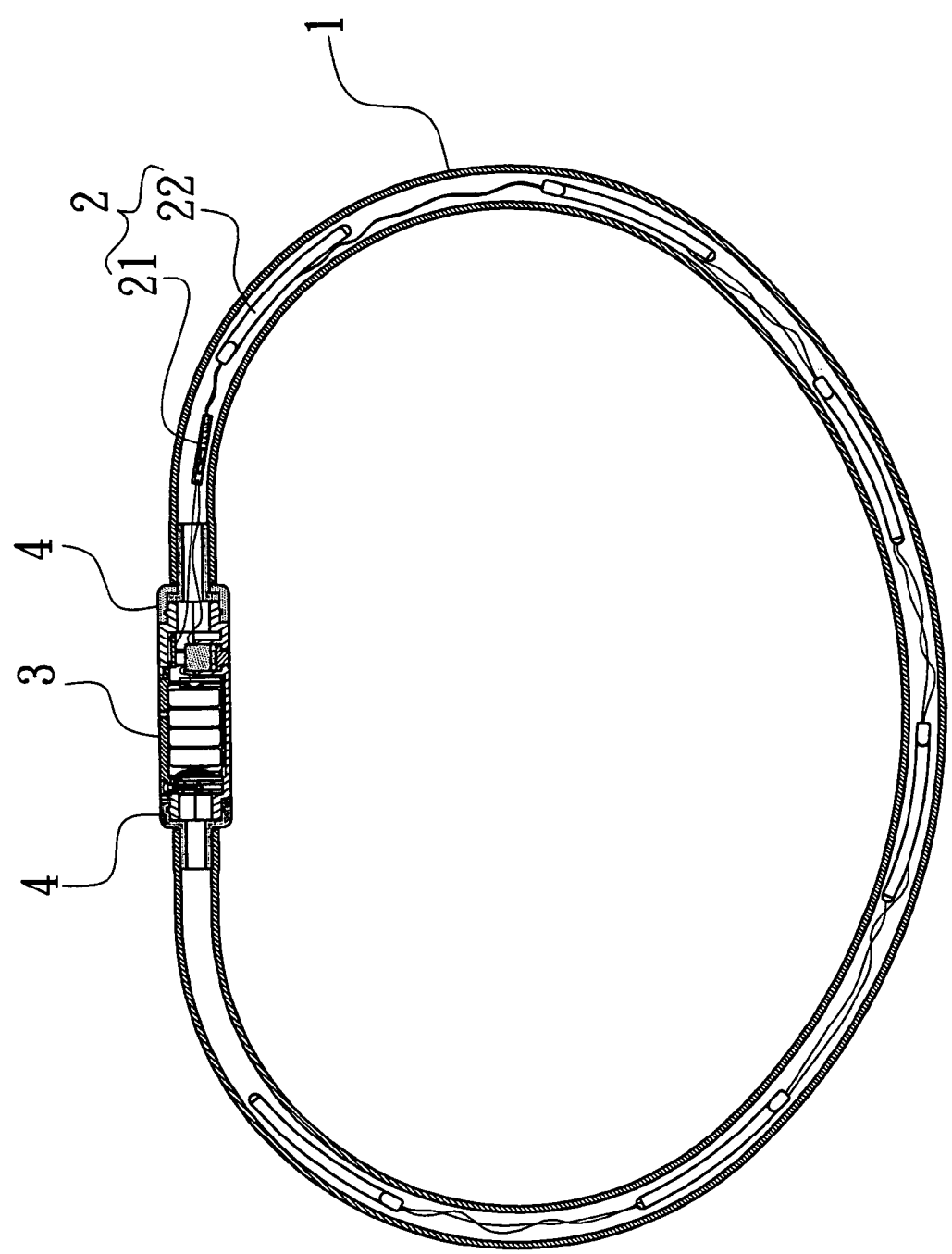
FIG. 2 is a vertical sectional view of the first preferred embodiment of a shining personal adornment in the present invention.
Figure 3:
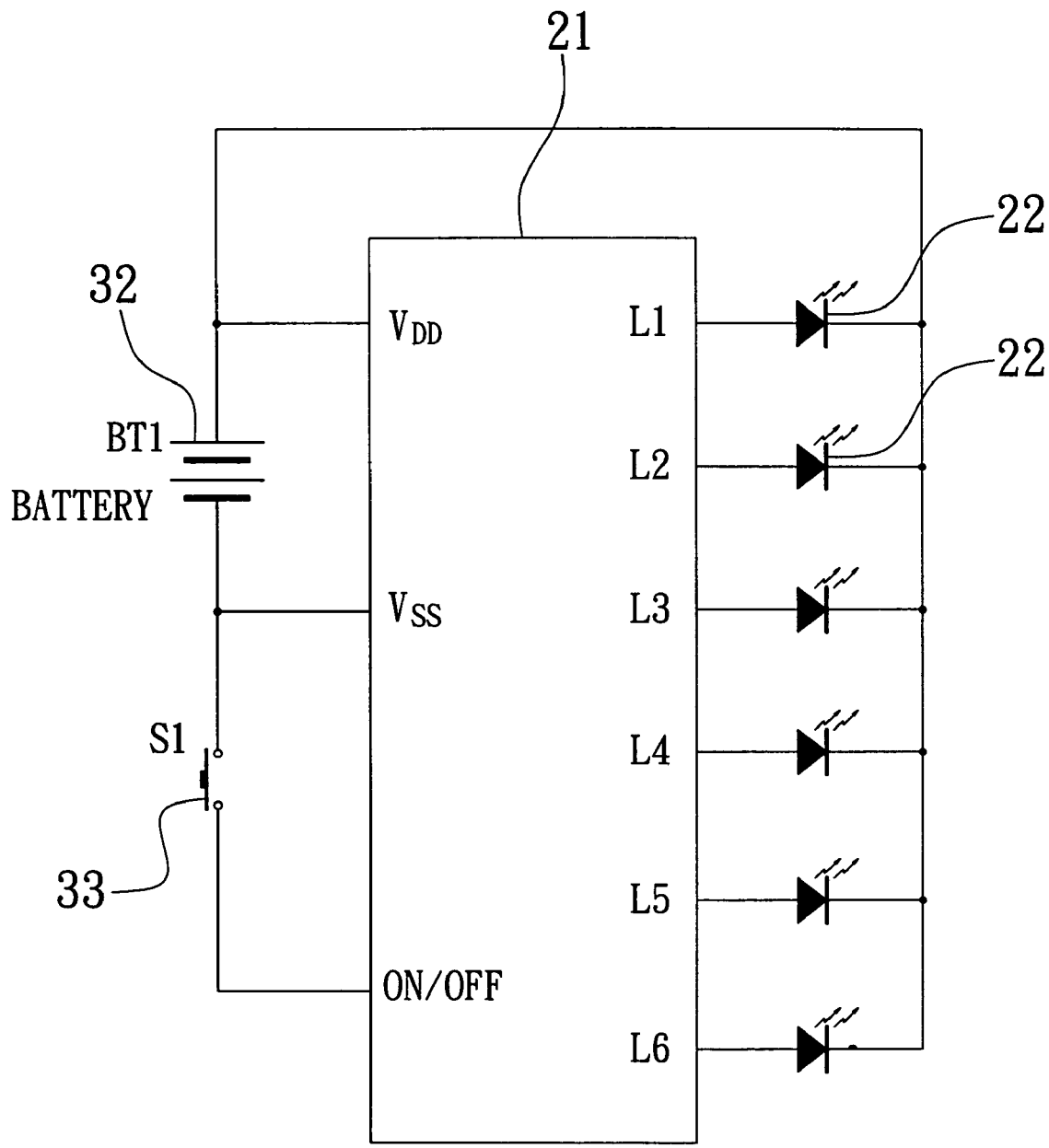
FIG. 3 is a circuit diagram of the shining personal adornment in the present invention, with light emitting diodes.
Figure 4:
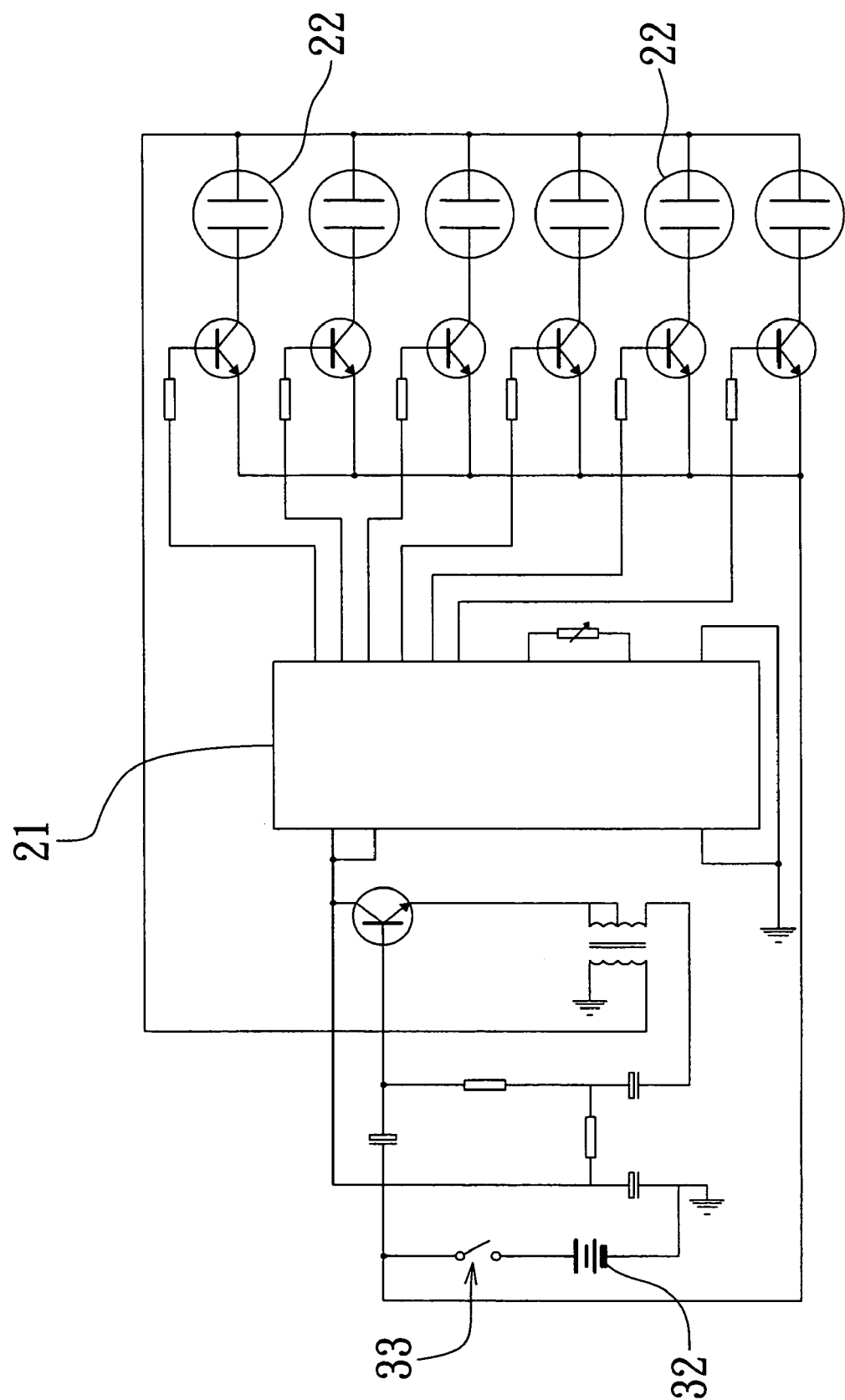
FIG. 4 is a circuit diagram of the shining personal adornment in the present invention, with EL threads and EL plates.
Figure 5:
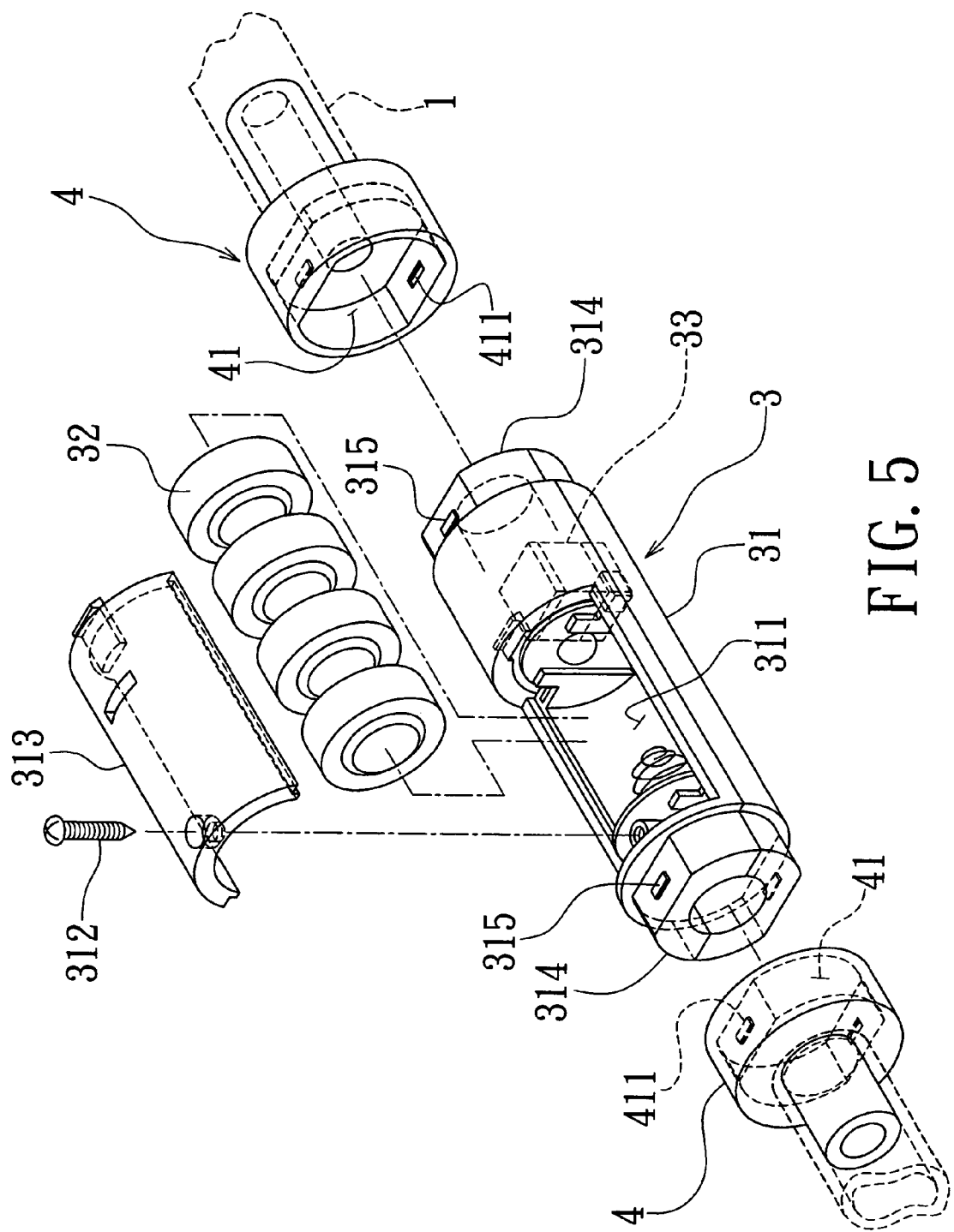
FIG. 5 is a partial exploded perspective view of the first preferred embodiment.
Figure 6:
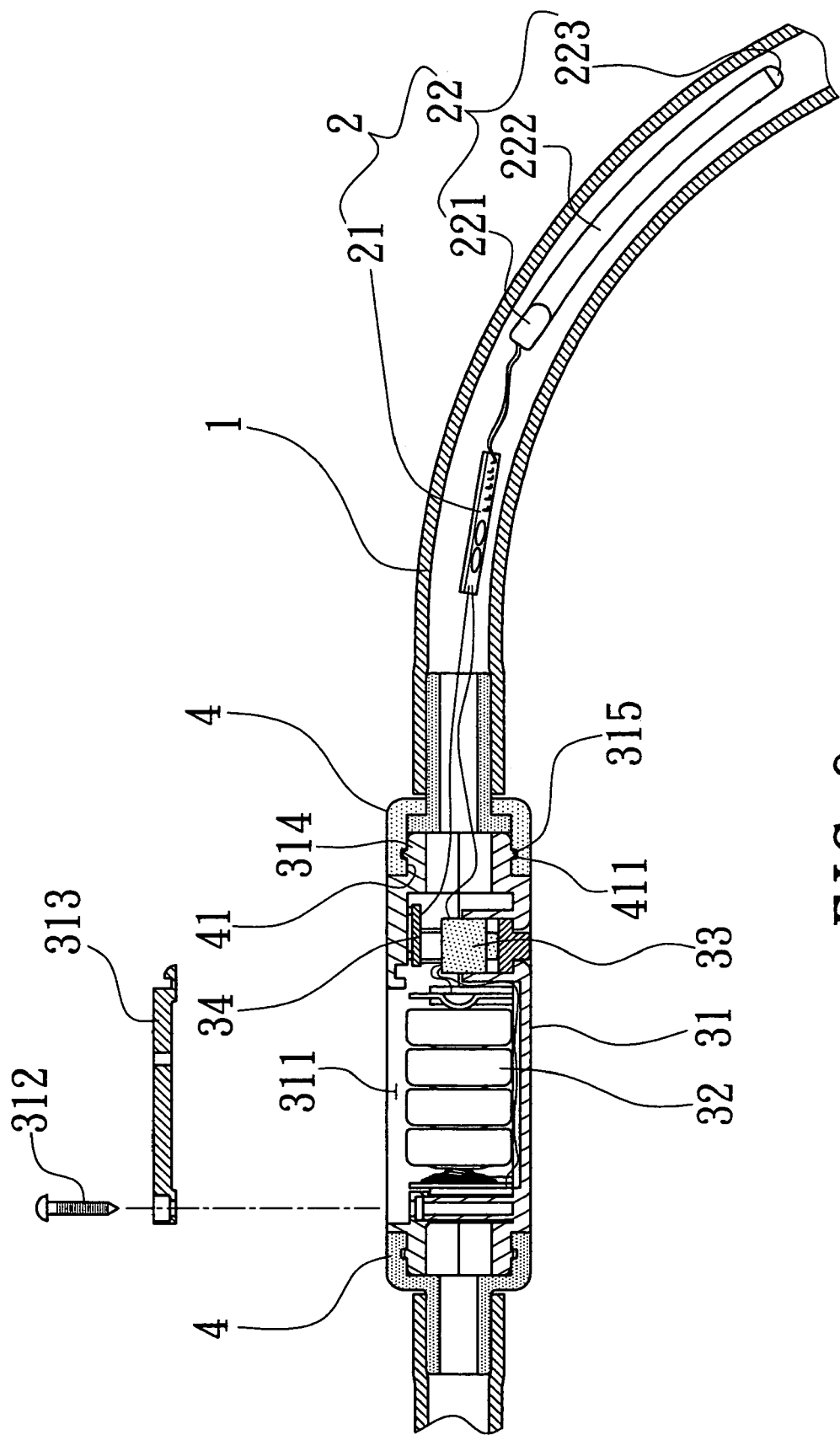
FIG. 6 is a partial sectional view of the first preferred embodiment.

The shining unit 2 is held in the hollow main body 1, and it includes a control circuit element 21, and several light emitting elements 22 electrically connected to the control circuit element 21. The light emitting elements 22 can be light emitting diodes, optical fibers, electro-luminescent (EL) threads or electro-luminescent plates. Or alternatively, each of the light emitting elements 22 can be comprised of a light emitting diode 221, and a stick-shaped light guiding object 222 as shown in FIG. 6; the light guiding object 222 is joined to an emitting end of the light emitting diode 221 at a first end, and has a reflecting coating 223 on a second end thereof; thus, after light travels through the second end of the light guiding object 222, it will be reflected by the reflecting coating 223, and the light guiding object 222 will be brighter.

The power supplying unit 3 includes a holding member 31, several batteries 32, a circuit board 34, and a switch 33 connected to the circuit board 34. The holding member 31 has a holding room 311 therein, an opening, a cover 313, and fitting portions 314 on two sides of the holding room 311. The batteries 32 and the circuit board 34 are held in the holding room 311, and the cover 313 is secured over the opening of the holding member 31 by means of threaded fixing elements 312. Each of the fitting portions 314 has engaging protrusions 315 thereon. The switch 33 is used for controlling flow of electricity from the batteries 32.

The connecting members 4 are joined to two ends of the hollow main body 1, and each has a receiving room 41, and fitting recesses 411 on an inner side thereof, facing the receiving room 41.

In assembly, the fitting portions 314 of the holding member 31 of the power supplying unit 3 are inserted in respective ones of the receiving rooms 41 of the connecting members 4 with the engaging protrusions 315 being respectively held in the fitting recesses 411, and with the shining unit 2 being connected to the power supplying unit 3. Thus, the power supplying unit 3 is securely joined to the connecting member 4, and the hollow main body 1 and the power supplying unit 3 together are in a substantially circular shape. The shining unit 2 will be powered by the power supplying unit 3, and the light emitting elements 22 shine when the switch 33 is in the "ON" position. And, the shining unit 2 will be cut off when the switch 33 is in the "OFF" position.

Figure 7:
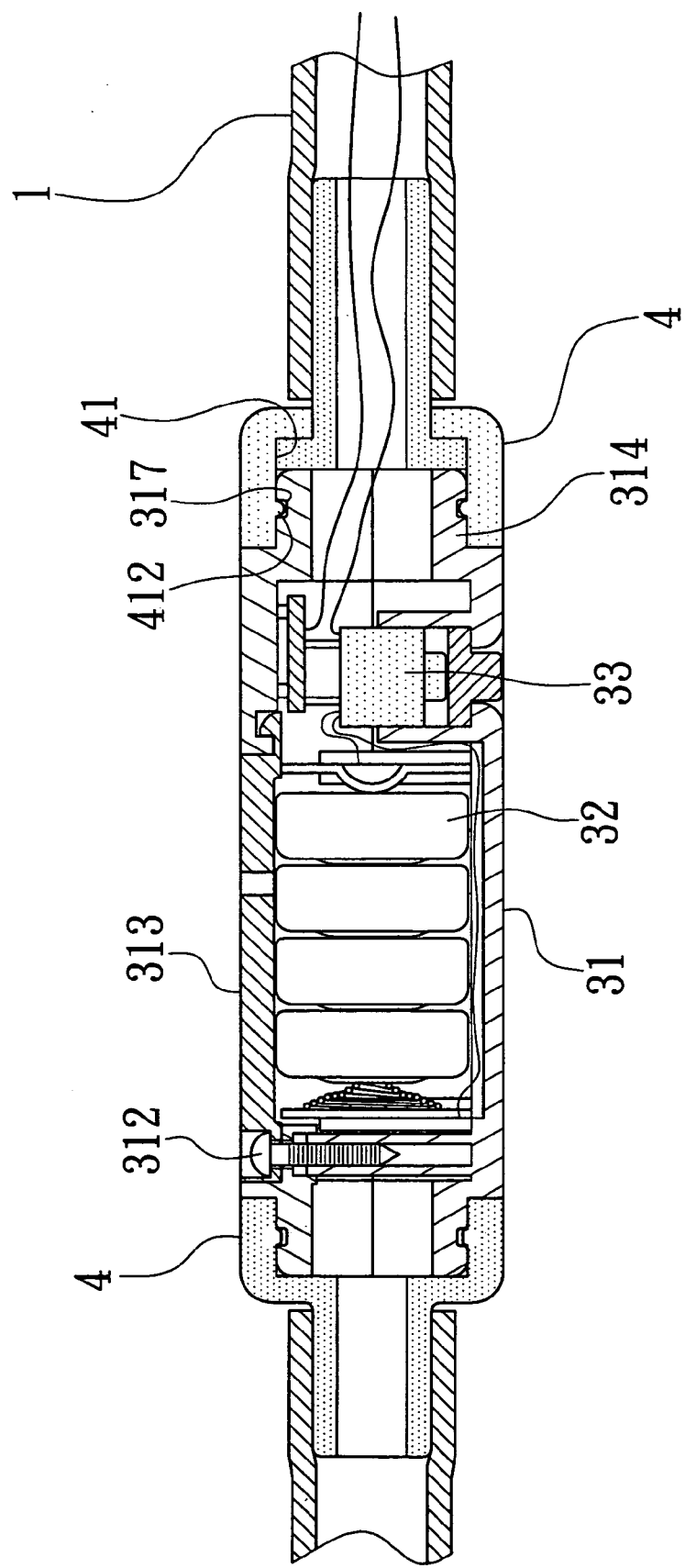
FIG. 7 is a partial sectional view of the second embodiment.

Referring to FIG. 7, which is a partial sectional view of the second preferred embodiment in the present invention, the fitting portions 314 are formed with fitting recesses 317 thereon instead of the engaging protrusions 315, and the connecting members 4 are formed with engaging protrusions 412 in the receiving rooms 41 instead of the fitting recesses 411; thus, the engaging protrusions 412 will be held in the fitting recesses 317 to secure the connection between the power supplying unit 3 and the connecting member 4 when the fitting portions 314 are inserted in respective ones of the receiving rooms 41 of the connecting members 4.

Figure 8:
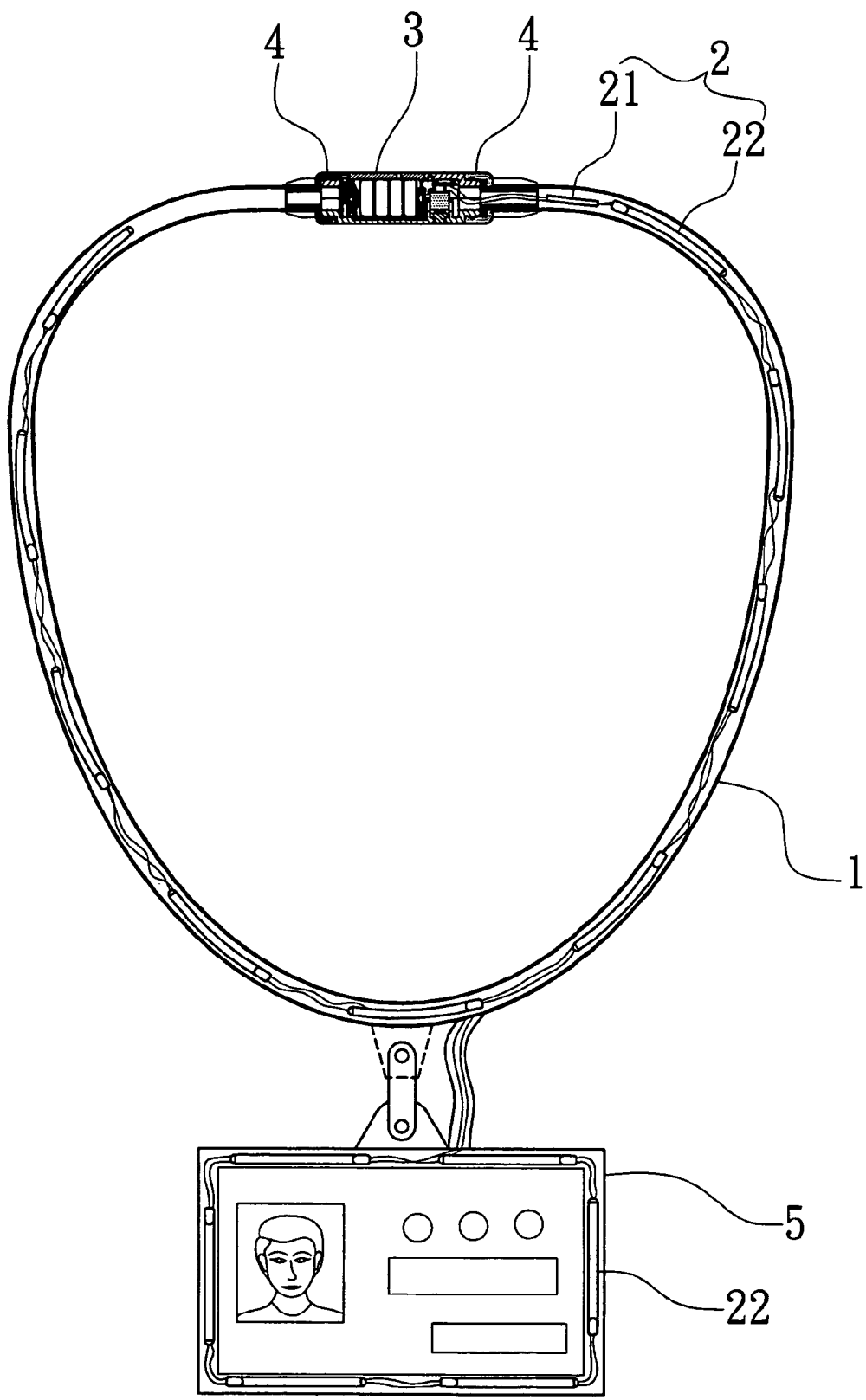
FIG. 8 is a view of the third preferred embodiment.

Referring to FIG. 8, the shining personal adornment further has an ornamental plate 5 connected to the hollow main body 1. The ornamental plate 5 has drawings, pictures or characters thereon, and it has several light emitting elements 22 spaced apart on an edge thereof, which are electrically connected to the power supplying unit 3. Therefore, the ornamental plate 5 will shine at the edge when the switch 33 is in the "ON" position.

From the above description, it can be seen that because the shining personal adornment of the invention has a substantially circular shape, it can be positioned around a person's neck, wrists, arms, shoulders or a pet's neck instead of being just held in hands. In other words, the present shining personal adornment is more fun to use, and can be used in more different ways as compared with conventional glowing sticks.

What is claimed is:

1. A shining personal adornment, comprising
   a hollow main body; the hollow main body being pervious to light;
   a shining unit held in the hollow main body; the shining unit including a control circuit element, and a plurality of light emitting elements electrically connected to the control circuit element;
   a power supplying unit; the power supplying unit including:
   (a) a holding member having a holding room therein; the holding member having fitting portions on two sides of the holding room; each of the fitting portions having a plurality of engaging protrusions thereon;
   (b) a plurality of batteries held in the holding room of the holding member;
   (c) a circuit board held in the holding room of the holding member;
   (d) a cover secured over an opening of the holding member by means of threaded fixing elements; and
   (e) a switch connected to the circuit board for controlling flow of electricity from the batteries; and
   two connecting members; the connecting members being joined to respective ones of two ends of the hollow main body; each of the connecting members having a receiving room therein, and a plurality of recesses on an inner side thereof;
   the fitting portions of the holding member being inserted in respective ones of the receiving rooms of the connecting members with the engaging protrusions being respectively held in the recesses of the connecting members such that the shining unit is connected to the power supplying unit, and such that the whole shining adornment is in a substantially circular shape.

2. The shining personal adornment as claimed in claim 1, wherein the light emitting elements are light emitting diodes.

3. The shining personal adornment as claimed in claim 1, wherein the light emitting elements are optical fibers.

4. The shining personal adornment as claimed in claim 1, wherein each of the light emitting elements includes a light emitting diode, and a stick-shaped light guiding object; the light guiding object being joined to an emitting end of the light emitting diode at a first end; the light guiding object having a reflecting coating on a second end thereof for reflecting light traveling through the second end of the light guiding object as well as making the stick-shaped light guiding object brighter.

5. The shining personal adornment as claimed in claim 1, wherein the light emitting elements are electro-luminescent strings.

6. The shining personal adornment as claimed in claim 1, wherein the light emitting elements are electro-luminescent plates.

7. The shining personal adornment as claimed in claim 1, wherein the hollow main body is tubular, and made of plastic.

8. The shining personal adornment as claimed in claim 7 further having an ornamental plate connected to the hollow main body; the ornamental plate having a plurality of light emitting elements, which are spaced apart on an edge, and are electrically connected to the power supplying unit.

9. The shining personal adornment as claimed in claim 1, wherein the hollow main body is tubular, and made of cloth.

10. The shining personal adornment as claimed in claim 9 further having an ornamental plate connected to the hollow main body; the ornamental plate having a plurality of light emitting elements, which are spaced apart on an edge, and are electrically connected to the power supplying unit.

11. A shining personal adornment, comprising
    a hollow main body; the hollow main body being pervious to light;
    a shining unit held in the hollow main body; the shining unit including a control circuit member, and a plurality of light emitting elements electrically connected to the control circuit element;
    a power supplying unit; the power supplying unit including:
    (a) a holding member having a holding room therein; the holding member having fitting portions on two sides of the holding room; each of the fitting portions having a plurality of recesses thereon;
    (b) a plurality of batteries held in the holding room of the holding member;
    (c) a circuit board held in the holding room of the holding member;
    (d) a cover secured over an opening of the holding member by means of threaded fixing elements; and
    (e) a switch connected to the circuit board for controlling flow of electricity from the batteries; and
    two connecting members; the connecting members being joined to respective ones of two ends of the hollow main body; each of the connecting members having a receiving room therein, and a plurality of engaging protrusions in the receiving room;
    the fitting portions of the holding member being inserted in respective ones of the receiving rooms of the connecting members with the engaging protrusions being respectively held in the recesses of the fitting portions of the holding member such that the shining unit is connected to the power supplying unit, and such that the whole shining adornment is in a substantially circular shape.

12. The shining personal adornment as claimed in claim 11, wherein the light emitting elements are light emitting diodes.

13. The shining personal adornment as claimed in claim 11, wherein the light emitting elements are optical fibers.

14. The shining personal adornment as claimed in claim 11, wherein each of the light emitting elements includes a light emitting diode, and a stick-shaped light guiding object; the light guiding object being joined to an emitting end of the light emitting diode at a first end; the light guiding object having a reflecting coating on a second end thereof for reflecting light traveling through the second end of the light guiding object as well as making the stick-shaped light guiding object brighter.

15. The shining personal adornment as claimed in claim 11, wherein the light emitting elements are electro-luminescent strings.

16. The shining personal adornment as claimed in claim 11, wherein the light emitting elements are electro-luminescent plates.

17. The shining personal adornment as claimed in claim 11, wherein the hollow main body is tubular, and made of plastic.

18. The shining personal adornment as claimed in claim 17 further having an ornamental plate connected to the hollow main body; the ornamental plate having a plurality of light emitting elements, which are spaced apart on an edge, and are electrically connected to the power supplying unit.

19. The shining personal adornment as claimed in claim 11, wherein the hollow main body is tubular, and made of cloth.

20. The shining personal adornment as claimed in claim 19 further having an ornamental plate connected to the hollow main body; the ornamental plate having a plurality of light emitting elements, which are spaced apart on an edge, and are electrically connected to the power supplying unit.

* * * * *